United States Patent [19]

Brown et al.

[11] Patent Number: 5,112,782

[45] Date of Patent: * May 12, 1992

[54] CATIONICALLY PROCESSED CALCINED KAOLIN CLAY

[75] Inventors: Steven A. Brown, New Brunswick; Paul Sennett, Colonia, both of N.J.

[73] Assignee: Engelhard Corporation, Iselin, N.J.

[*] Notice: The portion of the term of this patent subsequent to Oct. 29, 2008 has been disclaimed.

[21] Appl. No.: 707,257

[22] Filed: May 23, 1991

Related U.S. Application Data

[63] Continuation of Ser. No. 593,356, Oct. 1, 1990, abandoned, which is a continuation of Ser. No. 347,612, May 4, 1989, abandoned, and a continuation-in-part of Ser. No. 347,834, May 4, 1989, and a continuation-in-part of Ser. No. 347,611, May 4, 1989.

[51] Int. Cl.$^5$ .............................. C04B 33/24
[52] U.S. Cl. ....................... 501/144; 501/142; 501/145; 501/153; 501/154; 423/118; 423/328; 209/5; 106/487; 106/488; 106/286.5; 106/287.17
[58] Field of Search ............ 106/286.5, 487, 214, 106/488, 457, 287.17; 210/716, 727; 423/111, 118, 328; 501/141

[56] References Cited

U.S. PATENT DOCUMENTS

| | | | |
|---|---|---|---|
| 1,233,713 | 7/1917 | Schwerin | 209/5 |
| 1,324,958 | 12/1919 | Feldenheimer | 209/5 |
| 3,014,836 | 12/1961 | Proctor | 501/150 |
| 3,021,195 | 2/1962 | Podschus et al. | 423/328 |
| 3,309,214 | 3/1967 | Podschus et al. | 106/486 |
| 3,519,453 | 7/1970 | Morris et al. | 501/150 |
| 3,586,523 | 6/1971 | Fanselow et al. | 106/486 |
| 3,594,203 | 7/1971 | Sawyer et al. | 106/487 |
| 3,736,165 | 5/1973 | Sawyer | 106/487 |
| 3,804,656 | 4/1974 | Kaliski et al. | 106/487 |
| 3,893,915 | 7/1975 | Mercade | 209/166 |
| 3,915,391 | 10/1975 | Mercade | 241/20 |
| 3,980,240 | 9/1976 | Nott | 241/20 |
| 3,990,642 | 11/1976 | Nott | 241/20 |
| 3,994,806 | 11/1976 | Rausch et al. | 210/728 |
| 4,106,949 | 8/1978 | Malden | 501/148 |
| 4,165,840 | 8/1979 | Lewis et al. | 241/20 |
| 4,174,279 | 11/1979 | Clark et al. | 210/736 |
| 4,182,785 | 1/1980 | Price | 501/147 |
| 4,186,027 | 1/1980 | Bell et al. | 501/147 |
| 4,210,488 | 7/1980 | Reuss et al. | 162/162 |
| 4,272,297 | 6/1981 | Brooks et al. | 106/465 |
| 4,381,948 | 5/1983 | McConnell et al. | 501/145 |
| 4,548,733 | 10/1985 | Vincent | 106/503 |
| 4,610,801 | 9/1986 | Matthews et al. | 252/181 |
| 4,711,727 | 12/1987 | Matthews et al. | 210/728 |
| 4,738,726 | 4/1988 | Pratt et al. | 209/5 |
| 4,767,466 | 8/1988 | Nemeh et al. | 106/487 |
| 4,772,322 | 9/1988 | Nemeh et al. | 106/487 |
| 4,820,424 | 4/1989 | Field et al. | 210/716 |

FOREIGN PATENT DOCUMENTS 0281134 3/1988 European Pat. Off. .
1181491 2/1970 United Kingdom .

OTHER PUBLICATIONS

Coco, C. E., Soy Protein Latex Interpolymers—Properties and Function, Preprint Tappi Coating Conference 1987, pp. 133-140.
J. M. Huber Corporation pp. 27-31 Kaolin Clays & Their Industrial Uses, NY 1949.

*Primary Examiner*—Theodore Morris
*Assistant Examiner*—Edward Squillante

[57] ABSTRACT

A method for producing a low abrasion calcined kaolin pigment which comprises forming an aqueous pulp of crude kaolin dispersing the pulp by adding thereto sufficient water-soluble organic cationic dispersant to impart a positive zeta potential to said particles and, preferably, an acidic pH to said pulp, removing coarse particles from said dispersed pulp and fractionating the dispersed pulp to separate a fine particle size fraction of mineral particles from coarser particles. The fine particle size fraction is dried, pulverized, calcined and repulverized.

15 Claims, 1 Drawing Sheet

CATIONICALLY PROCESSED CALCINED KAOLIN CLAY

This is a continuation of co-pending application Ser. No. 07/593,356 filed on Oct. 1, 1990, now abandoned, which is a continuation of Ser. No. 07/347,612 filed on May 4, 1989, now abandoned, and a continuation in part of U.S. Ser. No. 07/347,834, filed May 4, 1989, and U.S. Ser. No. 07/347,611, filed May 4, 1989.

FIELD OF THE INVENTION

This invention relates to low abrasion calcined kaolin opacifying pigments and their manufacture. In particular, the invention relates to novel cationic processing of kaolin crudes prior to calcination that leads to calcined kaolin pigments having superior properties.

BACKGROUND OF THE INVENTION

In the manufacture of paper and paper board, it is well-known to incorporate quantities of inorganic fillers into the fibrous web in order to improve product quality. It is also well known to coat paper and paper board with inorganic pigments to improve opacity, print quality, and frequently sheet brightness. Titanium dioxide is widely used to improve brightness and opacity of coated and filled sheets but it is an expensive pigment. In recent years, considerable efforts have been made to develop satisfactory replacements for titanium dioxide. Substantially anhydrous kaolin clays prepared by partially or fully calcining a fine particle size fraction of crude kaolin clay is now a replacement pigment of choice. See, for example, U.S. Pat. No. 3,586,523, Fanselow et al, the teachings of which are incorporated herein by cross-reference. Calcined kaolin clay opacifying pigments, such as the products supplied under the registered trademarks ANSILEX and ANSILEX 93 by Engelhard Corporation are exemplary. These products are substantially anhydrous white pigments and are widely used as fillers in paper sheets and paper board, as a coating pigment for paper, and as a pigment in paints and other filled systems. They consist of aggregates of clay particles, and exhibit exceptionally high light scattering and opacifying characteristics when incorporated as a filler into paper. The particle size of these pigments is typically at least 65 percent by weight finer than 2 micrometers equivalent spherical diameter (esd), and at least 50 percent by weight finer than 1 micrometer. Especially when used to coat or fill paper products, low abrasion is essential. The calcined kaolin pigments presently used by the paper industry exhibit low abrasion values, generally less than 50 mg., and usually below 30 mg., as measured by the Valley test method.

Calcined kaolin clay pigment includes kaolin clays which have been dehydroxylated by heating to temperatures over 400° C. The term "calcined" thereby embraces fully calcined kaolins-which usually have been heated above the 980° C. exotherm, as well as so-called "metakaolin," which results from heating to lower temperatures, below the exotherm. Reference is made to the following which relate to fine particle size, low abrasion, opacifying calcined kaolin pigments, Proctor, U.S. Pat. No. 3,014,836; Fanselow et al., U.S. Pat. No. 3,586,823; Morris, U.S. Pat. No. 3,519,453; Podschus, U.S. Pat. Nos. 3,021,195 and 3,309,214, and British Pat. No. 1,181,491 and U.S. Pat. No. 4,381,948, McConnell et al.

Naturally-occurring sources of kaolin, generally known as kaolin crudes, such as those mined in Georgia, U.S.A. and Cornwall in England, are processed to recover upgraded kaolin products. Many Georgia crudes contain well-crystallized finely divided particles of kaolin having a median particle size of about 1.5 micrometers in association with silica and silicate impurities as well as colored ferruginous and titaniferous impurities. Other commercially important Georgia crudes contain less well-crystallized kaolin which are finer in particle size, e.g., median size below 1 micrometer. The latter find widespread use in calcined form in applications such as paper coating and filling in which high opacification and low abrasivity, frequently also high brightness, are demanded. Vast tonnages of such kaolin crudes are mined for the ultimate recovery of purified grades of kaolin having a higher brightness and different particle size distribution than that of the kaolin in the crude. The processing, frequently referred to as "wet processing", almost invariably involves crushing the kaolin crude, pulping the crushed crude in water, removing coarse impurities (so-called grit), fractionating the degritted crude to recover one or more fractions of desired particle size distribution, optionally bleaching to brighten one or more of the fractions of kaolin, filtration and washing. In some cases, additional upgrading to remove colored impurities by flotation, selective flocculation and/or magnetic purification is practiced and usually takes place before filtration and drying.

The manufacture of low abrasion calcined kaolin opacifying pigment has heretofore invariably utilized anionic wet processing of carefully selected crudes by processes including degritting, fractionation, recovery of the fine fraction (see, for example, Fanselow et al and McConnell patents, supra). In some cases, flotation, magnetic purification, bleaching or combinations of such steps is practiced. The recovered fine fraction of a selected crude, typically one composed of poorly crystallized kaolin, is recovered, pulverized, calcined and repulverized. Other low abrasion calcined pigments utilize as calciner feed material generally known as mechanically delaminated clay, a material recovered by mechanical delamination of coarse particle size fractions of well-crystallized kaolin recovered during wet processing. See, for example, Morris et al, supra.

When kaolin crudes are mixed in water without addition of dispersant the resulting pulps are usually mildly acidic, typically having a pH of 4-6 and the kaolin particles are flocculated and negatively charged. To the best of our knowledge, one or more anionic dispersants are invariably added to a pulp of the crude to create near neutral or mildly alkaline systems before degritting and fractionation and other wet processing steps such as delamination, flotation, magnetic purification, etc.

The history of using alkali or negatively charged material as primary dispersants for negatively charged clay dates at least back to 1912 (Reissue U.S. Pat. No. 14,583, Scherwin). This patent teaches using "electrolytes containing ions of an electric character which is the same as the character of the part of the composite mass which it is desired shall remain in suspension in sol-condition". This concept is pursued in Scherwin's subsequent patent (U.S. Pat. No. 1,233,713), which discloses fractional sedimentation of kaolin in a dispersed system. An advance is reflected in U.S. Pat. No. 1,324,958 (Feldenheimer) in which an acidic material is used to neutralize the alkaline deflocculating agent and to flocculate the clay in order to settle materials not ordinarily settled in a deflocculated condition. Subsequent patents disclose particle size fractionation of kaolin in dispersed state in centrifuges, usually followed by flocculation by acid addition, filtration and water washing of the filter cake. A major advance in the development of the kaolin industry was reflected in the establishment of a 2 micrometers particle size cut-off point when fractionating kaolins to prepare paper coating clay and the use of centrifuges to carry out the desired fractionation of the crude clay. Crudes having a median particle size of 1.5 micrometers are conventionally classified in centrifuges to recover premier coating grades (at least 90% by weight finer than 2 micrometers) and coarse filler kaolin having a median size of 4–6 micrometers. A major present use of kaolin crudes is as a source of bleached less than 2 micrometers fractions of kaolin clay supplied principally for the paper coating industry.

The growth of the kaolin industries in the U.S. and abroad has also generated many other innovations including the use of a variety of primary dispersants, all anionic, and including sodium silicates, silicate hydrosols, condensed phosphate salts, polyacrylate salts, and "auxiliary" dispersants such as sulfonates.

Cationic surfactants have been disclosed as a means to disperse various clays, but the utility is confined to dispersions in organic liquids. See, for example, U.S. Pat. No. 2,797,196, Dunn et al.

In accordance with U.S. Pat. No. 3,804,656, Kaliski, et al, a negatively charged filler or pigment such as kaolin is dispersed with a combination of nonionic and cationic surface active agents at a strongly alkaline pH. The cationic material is not added as a primary dispersant nor is it present during wet processing.

U.S. Pat. No. 4,738,726, Pratt et al, discloses high bulking pigments obtained by adding a cationic polyelectrolyte to previously degritted and fractionated kaolin clay to partially flocculate the clay. Anionic primary and secondary dispersants are used and the cationic material is used to partially flocculate, not to disperse the clay.

U.S. Pat. No. 4,210,488 (Reus et al) discloses addition of a cationic polymer (polypiperidine halide) "absorbed" on a fine particle carrier such as kaolin to improve the dry strength of paper or to improve the effect of optical brighteners. The absorbed polymer is said to create a positive charge on the kaolin particles. The cationic material is not added during wet processing of the carrier.

Numerous publications make reference to the addition of cationic polyelectrolytes to paper coating compositions containing mineral pigments such as clay or calcium carbonate to improve the coating structure by imparting a bulked structure. See, for example, Coco, C. E., Soy Protein Latex Interpolymers—Properties and Function, Preprints TAPPI Coating Conference 1987.

EPA 281,134 (Weige) relates to cationic pigment dispersion, especially for producing paper coating compositions, containing a pigment component, a cationised polymer, which encloses the pigment particles as a protective colloid, and optionally a cationic polymer and/or ammonium compound as dispersant for the coated pigment particles. The cationic polymer PVA increases the zeta potential of the dispersion to the isoelectric point or into the cationic region. The pigment can be ground or precipitated calcium carbonate, (calcined) kaolin, $TiO_2$, ZnO, satin white, aluminum hydrosilicates or their mixtures.

U.S. Pat. No. 4,078,947, Bundy et al, relates to a process for producing a calcined clay product having finer particles and producing higher void volume in coatings wherein a Georgia kaolin is blunged with an anionic dispersant (sodium polymetaphosphate), fractionated and the fine fraction is treated with citric acid and polyamine fatty acid amine or a quaternary ammonium salt, flocculated, filtered, dried, pulverized, calcined and repulverized.

Our copending patent application, U.S. Ser. No. 07/309,456 filed Feb. 10, 1989, discloses the use of cationic polymers and the like as secondary dispersants to prepare stable aqueous slurries of calcined kaolin pigments.

To the best of our knowledge, the prior art does not disclose or suggest the use of cationics as primary dispersants for kaolin, much less for wet processed kaolin intended to be utilized as calciner feed to produce calcined kaolin pigments.

SUMMARY OF THE INVENTION

One aspect of the invention is a process for producing a low abrasion, fine particle size opacifying pigment from a kaolin clay crude wherein the crude is upgraded by wet processing, prior to calcination, in the presence of a primary dispersant which is a cationic material used in dispersant effective quantity, preferably at an acidic pH.

Another aspect of the invention comprises novel calcined kaolin pigments produced by the process, the pigments being characterized by being composed of calcined kaolin particles having a coarser particle size than is obtained using conventional anionic prior art primary dispersants. Unexpectedly, coarsening of the particles prior to and subsequent to calcination results in pigments having remarkably low abrasion. The prior art (see Proctor and McConnell et al, supra) suggest that finer particle size calciner feed results in reduced abrasion. This is contrary to our findings regarding fineness as affected by changing from anionic to cationic primary dispersion. Another character of the calcined kaolin pigments is the improved printability of paper sheets coated with our pigments.

The coarser particle size of pigments of the invention obtained by cationic dispersion is in contrast to the finer particle size achieved by Bundy et al (supra) as result of anionic dispersion followed by flocculation with a cationic material.

The accompanying figure illustrates embodiments for upgrading appropriate kaolin crude to produce calcined pigments, all utilizing a cationic material for primary dispersion. One results in a cationically predispersed dry intermediate kaolin (INTERMEDIATE A) and another results in a anionically predispersed intermediate kaolin (INTERMEDIATE B). The term "predispersed" is used herein in the conventional sense, i.e., a dry product which when mixed with water results in a slurry in which the kaolin particles are in a dispersed condition without further addition of dispersant.

After a double pulverization step, the hydrous predispersed kaolin products are calcined to produce anhydrous opacifying kaolin pigments. The calcined pigments illustrated in the figure are: cationically predispersed hydrous pigment after calcining at 1680° F. for 40 minutes (PRODUCT A); cationically predispersed hydrous pigment after calcining at 1980° F. for 40 minutes (PRODUCT B); anionically predispersed hydrous pigment after calcining at 1680° F. for 40 minutes (PRODUCT C); and anionically predispersed hydrous pigment after calcining at 1980° F. for 40 minutes (PRODUCT D). A pulverization step incorporated after the calcining step is required for all products.

DETAILED DESCRIPTION OF PREFERRED EMBODIMENTS

Figure 1:
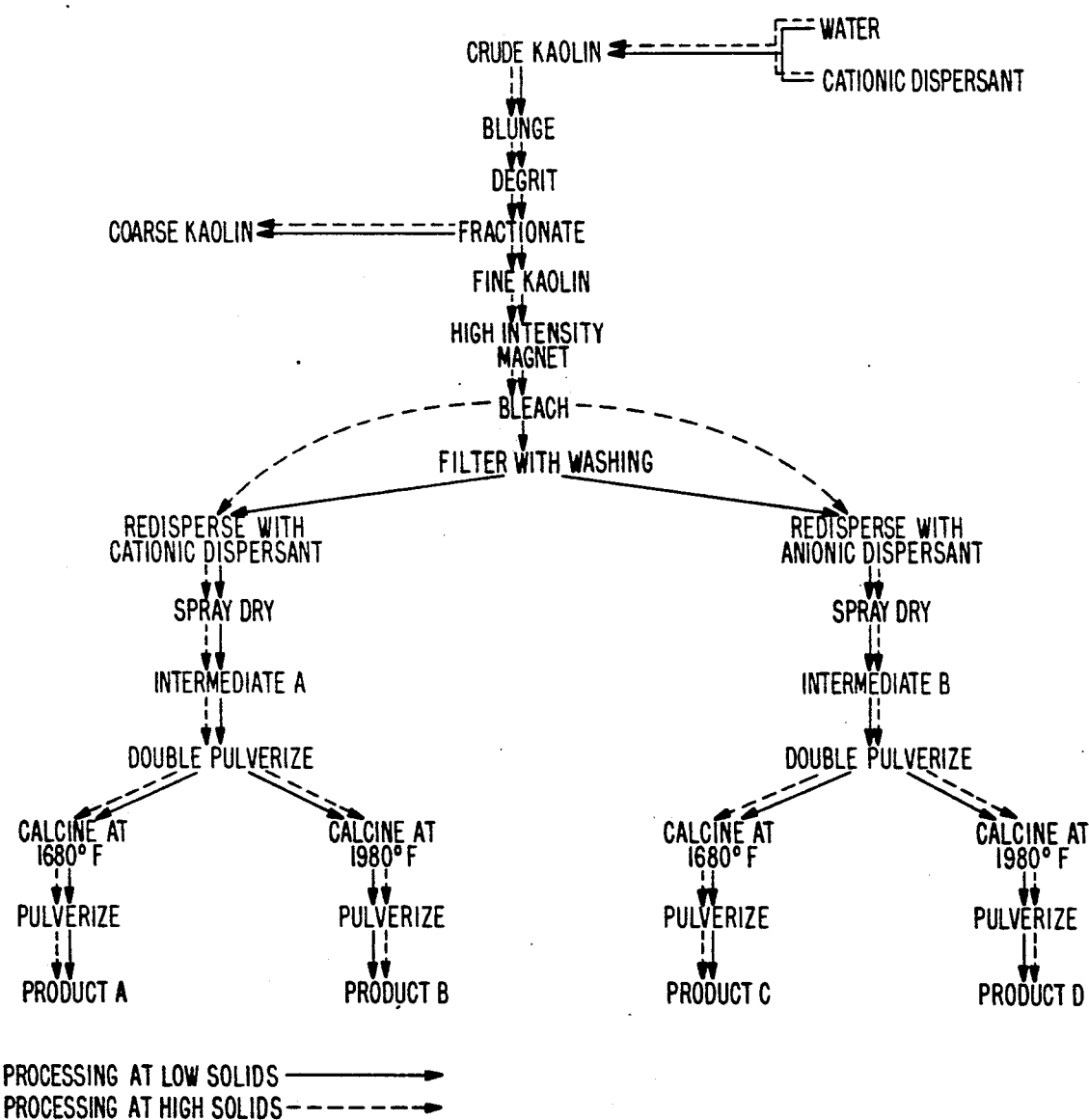

The process of the present invention is conveniently carried out by adding a dispersant effective amount of one or more cationic materials to the required amount of water for the desired clay solids in a vessel equipped with a stirrer. Once the cationic dispersant has dissolved, the crushed kaolin crude is added slowly with sufficient agitation to give a well dispersed fluid suspension. If necessary, the slurry may be passed through a sieve or other conventional degritting apparatus such as a "sandbox" to remove undispersed aggregates or coarse impurities.

A crude kaolin cationically dispersed and degritted at a high solids level of 55% to 65% may be further upgraded at high solids by subsequent centrifugation steps to classify the kaolin into more desirable particle size fractions. Since the cationically dispersed kaolin slurries are at an acidic pH ranging from 3.0 to 5.0, reducing bleaches such as sodium dithionite may be added directly, using the same quantities as in conventional anionic processing systems which normally range from 4 lb. to 15 lb./ton active bleach (based on the weight of the dried kaolin in the slurry.) Bleaching improves the color properties of kaolin pigments. The kaolin slurry is then spray dried directly after bleaching, thereby eliminating a costly filtration step necessary in low solids processing. The spray dried material is a cationically predispersed hydrous dry kaolin product (INTERMEDIATE A in the figure).

A product similar to INTERMEDIATE A processed at high solids may be produced by a low solids process, ranging from 20% to 30% slurry solids; however, a slurry filtration step is necessary to increase the solids content prior to spray drying. To carry out this embodiment of the invention, an appropriate anionic dispersing agent such as sodium silicate, sodium polyacrylate, sodium condensed phosphate or mixture thereof is added to the low solids cationically dispersed slurry in amount sufficient to effect charge reversal of the kaolin to negative and to flocculate the slurry which is filtered, washed, redispersed with a cationic dispersant and spray dried. The spray dried product is pulverized, calcined and repulverized. Thus, cationics are used as both primary and secondary dispersants in practice of this embodiment of the invention.

Anionic intermediate pigments can be produced from cationically predispersed kaolin by adding anionic dispersing agents. To prepare such intermediate pigments, appropriate anionic dispersing agents such as alkali silicates (sodium silicate), sodium polyacrylates, tetrasodium pyrophosphate, etc. may be added to the cationic slurries individually or in various combinations in amounts adequate to render a charge reversal of the pigment to negative. The addition of anionic materials to effect charge reversal may be carried out using either low or high solids slurries. When added to high solids slurry a costly filtration step is eliminated and the slurry is sent directly to the spray drier which produces a dry anionically predispersed hydrous kaolin product (INTERMEDIATE B) in the figure. In low solids processing, sufficient anionic dispersant is added to flocculate the slurry which is then filtered with subsequent water washing of the filtercake.

Presently preferred primary cationic dispersants (or secondary cationic dispersants, when used) are water soluble cationic polyelectrolytes. Calcination of pulverized intermediate products is carried out to produce metakaolin or fully calcined pigments using known pulverizing and calcination equipment such as rotary calciners or Nichols-Herreshoff furnaces. As in conventional processing to produce calcined kaolin pigments, the calciner discharge is repulverized.

Cationic polyelectrolytes are characterized by a high density of positive charge. Positive charge density is calculated by dividing the total number of positive charges per molecule by the molecular weight. Generally the high charge density of polyelectrolytes exceeds $1 \times 10^{-3}$ and such materials do not contain negative groups such as carboxyl or carbonyl groups. In addition to the alkyl diallyl quaternary ammonium salts, other quaternary ammonium cationic polyelectrolytes are obtained by copolymerizing aliphatic secondary amines with epichlorohydrin. See U.S. Pat. No. 4,174,279. Still other water-soluble cationic polyelectrolytes are poly(quaternary ammonium) polyester salts that contain quaternary nitrogen in a polymeric backbone and are chain extended by the groups. They are prepared from water-soluble poly(quaternary ammonium salts) containing pendant hydroxyl groups and bifunctionally reactive chain extending agents; such polyelectrolytes are prepared by treating an N, N, $N^{(1)}$, $N^{(1)}$ tetraalkylhydroxyalkylenediamine and an organic dihalide such as a dihydroalkane or a dihaloether with an epoxy haloalkane. Such polyelectrolytes and their use in flocculating clay are disclosed in U.S. Pat. No. 3,663,461. Other water soluble cationic polyelectrolytes are polyamines. Polyamines are usually supplied commercially under trade designations; chemical structure and molecular weight are not provided by the suppliers.

The aforementioned cationic dispersants are known when used at appropriate dosages to partially flocculate negatively charged clays. See, for example, U.S. Pat. No. 4,738,726 (Pratt et. al.), and references cited therein. It should be noted that as incremental dosages of such cationic materials are added to anionically charged particles, the initial effect is that of flocculation. As dosages increase beyond the levels at which flocculation occurs, dispersion (deflocculation) occurs and the charge on the particles becomes positive. Charge may be determined by the use of the Lazer Zee Meter, Model 501, manufactured by PEN KEM, Inc; other zeta potential measuring devices can be used.

Cationic dispersants used in the practice of this invention also include low molecular weight polyamines (e.g., ethylene diamine or hexamethylene diamine), long carbon chain amines or quaternary ammonium salts (e.g., "dimethylditallow" ammonium chloride). Foaming may be a problem with surface active quaternary ammonium compounds such as dimethylditallow ammonium chloride.

The amount of cationic dispersant required depends on the nature of the cationic dispersant as well as the nature of the surface of the mineral particles. A lower molecular weight diallyl polymer salt is less effective in conferring a cationic charge than is the same polymer of higher molecular weight. Quaternary ammonium polymers of high charge density are more effective than those of lower charge density. Higher surface area, fine particle minerals require more dispersant than do coarser particles. The magnitude of the anionic charge before treatment with the cationic dispersant also affects the amount required. A mineral carrying a high anionic charge will require a greater amount of cationic dispersant than will a mineral which initially has a lower anionic charge.

A dimethyl diallyl quaternary ammonium chloride polymer commercially available under the trademark designation Polymer 261LV from the Calgon Corporation has been found to be particularly useful in the practice of the present invention. The polymer is supplied as an aqueous solution containing approximately 42% active polymer; the supplier estimates the molecular weight of the reagent to be between 50,000 and 250,000. Generally, 0.2 to 0.75 percent active Calgon 261LV is required to disperse crude kaolins in aqueous suspensions in the range of 45% to 60% solids. The particle size distribution and surface area of the kaolin dictate the amount of polymer required to impart cationic dispersion in the slurries. Cationically dispersed kaolin slurries are acidic and pH ranges between 3.0 and 5.0 as measured on a pH meter. Kaolins that have been previously treated with anionic agents require even higher amounts of Calgon 261LV to disperse them cationically.

The following nonlimiting examples are given to illustrate the best modes presently contemplated for practicing this invention.

All particle sizes in these examples in the micrometer size range were determined by a conventional sedimentation technique using the Sedigraph ® 5000 analyzer. All pH values were determined by an Orion Research pH meter (model 701A). All charge values were obtained by use of the Lazer Zee Meter.

When sodium silicate was used in illustrative examples, N®Brand sodium silicate was employed. N®Brand sodium silicate is a solution containing about 8.9 wt % $Na_2O$, about 28.9 wt % $SiO_2$ and 62 wt % water.

EXAMPLE 1

This example illustrates the use of cationic dispersion in the wet processing of a 50%:50% blend of two Georgia kaolin crudes from mines commonly referred to as Dixie and Califf. The crude blend contains a large number of finely divided kaolin particles and is of the type useful in producing low abrasion calcined kaolin opacifying pigments. A control sample to illustrate conventional anionic wet processing was also prepared. The kaolins were received as crushed crudes. The Dixie sample was at 80.2% solids (19.8% volatiles); and the Califf sample was at 81.6% solids (18.4% volatiles).

Following is a description of the wet processing of the crude blend using cationic primary dispersion.

Deionized water (4930 g) was weighed into a two gallon beaker. Using low speed stirring (300 r.p.m.) provided by a drill press mixer equipped with a 2" uplift stainless steel propeller, 0.60% active Calgon 261LV (44.5% active aqueous solution) based on the dried weight of the crude kaolin was added to the deionized water. Slowly and simultaneously 2500 g of each crude calculated on a dry weight basis (3117 g Dixie and 3064 g Califf) was added to the diluted polymer solution during continuous stirring at a moderate speed. To further disperse the slurry, an additional 0.15% active Calgon 261LV (44.5%) based on the dried weight of the kaolin was added to the slurry and stirring continued for one hour at an increased speed of 1000 r.p.m. The dispersion of the slurry was checked by examining the sediment that formed after permitting the slurry to settle in the beaker overnight. The supernatant portion was poured out and retained and the sediment that had formed was hard and evenly stratified, indicating adequate dispersion in the slurry for degritting and fractionation. The supernatant portion was recombined with the sediment and stirring at 1000 r.p.m. on the drill press followed. The slurry pH was 4.0.

Degritting the acidic cationically dispersed kaolin slurry was carried out by passing it over a 100 mesh (U.S.) sieve. The >100 mesh residue was set aside and the <100 mesh slurry that passed through the sieve was collected and immediately passed over a 325 mesh sieve (U.S.). The >325 mesh residue that collected on top of this sieve was combined with the previously collected >100 mesh residue. This portion was set aside. Yield of the <325 mesh portion was found to be 67% and the slurry solids was 25.2%. A +50 mv zeta potential value on the <325 mesh fraction was obtained with the aid of the Lazer Zee Meter (model 501 Pen Kem Inc.) after diluting a portion of the slurry with deionized water. During moderate stirring on the drill press, the 25.2% solids slurry was diluted to 15% solids with an addition of 8770 g of deionized water and the slurry was dispersed further by adding 0.05% active Calgon 261LV based on the dried weight of the kaolin.

The <325 mesh slurry was then fractionated to extract the <1 micrometer particles (equivalent spherical diameter) by using a conventional gravitational sedimentation method. The slurry was divided equally into two five gallon plastic buckets (having straight walls), and the resulting slurry height in each of the buckets was 19 cm. After permitting the slurries to static settle for 53 hours, the supernatant portions were gently poured out and retained. The hard sediments that had formed on the bottom of the buckets were diluted with deionized water, mixed on the drill press, combined and remixed vigorously on the drill press. The slurry formed from the sediments was at 17.9% solids.

A second gravitational sedimentation was carried out to recover additional <1 micrometer material from the sediments formed by the previous fractionation. The slurry (from sediments) was diluted to 15% solids by adding deionized water during stirring on the drill press. The height of the slurry in the bucket was 21 cm. After permitting the slurry to settle undisturbed for 40 hours, the top 13 cm of supernatant was gently siphoned off and collected in a separate beaker. The supernatants obtained from the first and second gravitational sedimentations were combined and stirred. Yield of the <1 micrometer fraction was found to be 64.0% and the slurry solids measured 7.6%.

The <1 micrometer fraction was upgraded further by passing the slurry through a high intensity magnetic separator Model #WHIMS 3×4L (Carpco Inc.) containing a steel wool matrix. Slurry was passed through the magnet at 100 ml per minute flow rate. The product collected was visually brighter and had a 6.1% solids content and a pH of 4.0.

To improve the brightness of the <1 micrometer fraction of acidic cationically dispersed magnetically purified kaolin slurry, it was bleached with 6 lb. of sodium dithionite reducing bleach based on one ton of dried kaolin. This was performed by sifting bleach powder into the slurry during manual stirring followed by 5 more minutes of stirring. The slurry was then permitted to static age overnight in a covered plastic bucket.

The final step in the cationic wet processing of this sample was to remove excess liquid. Since the solids content in the slurry was only 6.2% and filtration by vacuum in Buchner funnels would consume too much time, the slurry solids was increased to 30.5% before filtration by centrifugation. This was done by centrifuging several portions of the low solids slurry in a SORVALL ® SS-3 centrifuge at 9500 r.p.m. until a clear supernatant was obtained. The clear supernatants were poured off and discarded and the sediments formed during centrifugation were mixed into the bleached slurry. The 30.5% solid slurry was then filtered under vacuum on several Buchner funnels by placing 655 g of slurry in each funnel (200 g dry kaolin). Each filter cake was rinsed twice with 200 ml of deionized water.

The rinsed filter cakes were then removed from the funnels and dried at 180° F. for 4 hours. The dried kaolin was then pulverized twice in a MIKRO-SAMPLMILL using the 0.039" round hole screen.

The particle size distribution of the cationically processed hydrous kaolin product was: 92% <2 micrometers, 80% <1 micrometer, 53% <0.5 micrometer, 0% <0.2 micrometer and median size was 0.48 micrometer. Block brightness of the pigment when measured on the Elrepho Reflectance Meter (Carl Zeiss Corp.) was 87.9%.

Preparation of an anionically processed kaolin pigment was carried out for purposes of comparison following the same wet processing steps used to produce the cationic pigment. The processing steps were slurry makedown with a primary dispersant, degritting, fractionating, high intensity magnetic separation, bleaching, filtration, and washing.

In the initial step of a slurry makedown with a primary dispersant, N®Brand sodium silicate (37.7% active aqueous solution) was added to the deionized water in the amount of 0.20% sodium silicate (dry basis) based on the dried weight of the crude kaolin blend (2500 g of Dixie and 2500 g of Califf). The crude kaolin was added to the diluted sodium silicate solution until the slurry solids was 45%. The slurry pH was 8.5. The yield of <325 mesh kaolin after degritting the slurry was 65% and the slurry was 31.1% solids (pH 8.5). Two gravitational sedimentations to obtain the <1 micrometer size kaolin particles were carried out after diluting the 31.1% solids degritted portion to 15% solids with deionized water. After the initial fractionation the sediment was diluted to 15% solids again, however, 0.05% sodium silicate based on the dried weight of the kaolin was added to the slurry to improve dispersion. The slurry pH was 8.4 and the kaolin was sedimented again to recover more of the <1 micrometer particles. The yield of the <1 micrometer fraction was 69.0% based on the <325 mesh portion and the slurry contained 9.0% solids. High intensity magnetic separation followed producing a brighter slurry. The slurry solids were 7.3%. The magneted slurry was further upgraded by dithionite bleaching. Since the slurry pH was 7.9 and dithionite bleaching is most effective in acidic systems, the slurry pH was adjusted to 3.0 by sufficient sulfuric acid (10% active solution) prior to the addition of bleach. Bleaching with sodium dithionite in an amount equivalent to 6 lb. per ton of dried kaolin was carried out by adding the bleach to the slurry while stirring. The pH of the bleached slurry after static aging overnight was 3.5. To remove the liquid phase from the slurry, it was filtered under vacuum on several Buchner funnels (2700 g per funnel) and the filter cakes were rinsed twice with 200 g of deionized water (2:1 rinse). The filter cakes were removed from the funnels and dried at 180° F. for 4 hours. Pulverization of the dried filter cakes followed by passing them twice through the MIKRO-SAMPLMILL.

The particle size distribution of the anionically processed hydrous kaolin product was: 98% <2 micrometers, 96% <1 micrometer, 82% <0.5 micrometer, 36% <0.2 micrometer, and the median size was 0.25 micrometer. Block brightness of the pigment when measured on the Elrepho Reflectance Meter was 87.2%.

EXAMPLE 2

This example illustrates the use of a cationic primary dispersant in the wet processing of a Georgia kaolin crude from a mine commonly referred to as Dixie. A control sample to illustrate conventional anionic wet processing was also prepared. As in Example 1, the crude used contains a large number of finely divided kaolin particles and is of the type useful in producing low abrasion calcined kaolin opacifying pigments. The Dixie crude was received as a crushed crude containing 80.2% solid materials (19.8% volatiles).

The use of a primary cationic dispersant in wet processing is described first.

The crude kaolin was made down in a slurry form at 45% solids as follows. Deionized water (4876 g) was weighed into a two gallon plastic beaker. Using low speed stirring (300 r.p.m.) provided by a drill press mixer equipped with a 2" uplift stainless steel propeller, 0.53% active Calgon 261 LV (44.5% solids) based on the weight of the dried kaolin was added to deionized water. Slowly and continuously 6235 g of Dixie crude (5000 g dry) was added to the diluted polymer solution during continuous stirring at a moderate speed (600 r.p.m.). After all of the crude was added, the stirring speed was increased to and maintained at 1000 r.p.m. for one hour. The dispersion of the slurry was checked by examining the sediment that formed after permitting the slurry to settle in the beaker overnight. The supernatant was poured out and retained and the sediment that had formed was hard and uniformly stratified, indicating adequate dispersion of the slurry for degritting and fractionating. The supernatant was recombined with the sediment and stirring at 1000 r.p.m. followed. The slurry was pH was 4.0.

Degritting the acidic cationically dispersed kaolin slurry was carried out by first passing it over a 100 mesh (U.S.) sieve. The >100 mesh residue was set aside and the <100 mesh slurry that passed through the sieve was collected and immediately passed over a 325 mesh (U.S.) sieve. Deionized water was used to rinse both of the sieves after which the two residues were recombined and set aside. Yield of the <325 mesh portion was found to be 86.9% and the slurry solids was 26.4%.

The degritted crude was then prepared for fractionating by a conventionally used gravitational sedimentation method to obtain only the finely divided particles measuring <1 micrometer (equivalent spherical diameter) in size. During moderate speed stirring on the drill press, the 26.4% solids cationically dispersed slurry was diluted to 15% solids with deionized water. The slurry was then divided equally into two straight walled five gallon plastic buckets which gave a 21 cm slurry height in each. After static settling the slurries for 53 hours, the top 17.5 cm of supernatant was siphoned off and retained. The hard sediments that had formed at the bottom of each bucket were diluted with deionized water to 15% solids, redispersed on the drill press mixer, recombined and then remixed at 1000 r.p.m. by the drill press. The height of the slurry in the bucket was 20 cm and pH was 4.0. To recover more fine material, the slurry was permitted to settle for 40 hours and the top 13 cm of supernatant was siphoned off and combined with the supernatant retained from the previous sedimentation. Yield of <1 micrometer material was found to be 63.8%.

The final step of cationically wet processing this sample was to remove the excess liquid. Since the volume of the slurry was large and the solids content low and filtration by vacuum in Buchner funnels would take a long time, the slurry solids was increased by centrifuging several portions of the slurry in the SORVALL centrifuge at 9500 r.p.m. until clear supernatants were obtained. The clear supernatants were poured out and discarded and the sediments formed during centrifugation were mixed into the original slurry, thereby increasing its solids content. This higher solids slurry was then filtered under vacuum on several Buchner funnels, in an amount equal to 200 g of dried kaolin.

The filter cakes were removed from the funnels and dried at 180° F. for 4 hours and double pulverization in a MIKRO-SAMPLMILL using the 0.039" round hole screen followed.

The particle size distribution of the cationically processed hydrous kaolin product was: 95% <2 micrometers, 81% <1 micrometer, 50% <0.5 micrometer, 0% <0.2 micrometer, and the median size was 0.50 micrometer. Block brightness of the pigment was 85.4%.

For purposes of comparison, an anionically processed pigment was prepared by following the same wet processing steps used to produce the previously made cationic pigment, but using an anionic primary dispersant. Processing steps included slurry makedown with a primary dispersant, degritting, fractionating, and filtering. Processing sequence, equipment, addition rates, and mixing speeds to process the anionically dispersed system were the same as those used for the previously processed cationically dispersed system.

In the initial step of slurry makedown with a primary dispersant, sodium silicate (37.7% active aqueous solution) was added to the deionized water in the amount of 0.20% based on the dried weight of the crude kaolin (5000 g). The crude kaolin was added to the diluted sodium silicate solution which resulted in 45% solids slurry and the slurry pH was 8.6. After degritting, the <325 mesh yield was 83.2% and the slurry contained 33.3% solids. Two gravitational sedimentations to obtain the <1 micrometer size kaolin particles were carried out by diluting the degritted slurry to 15% solids with deionized water. After the initial fractionation the sediment was diluted to 15% solids and the slurry was settled again. Yield of the combined fine fractions was 64.1% and the pH of the slurry was 8.3. The next step in processing was to remove the excess liquid by filtration. To speed filtration, the fine fraction slurry was flocculated by adding sulfuric acid (10% active solution) in an amount sufficient to reduce the pH to 3.5. After permitting the flocculated slurry to stand overnight, the kaolin flocs settled and the clear supernatant was poured out and discarded. The concentrated slurry was then filtered on several Buchner funnels (200 g dry kaolin each). Each filtercake was rinsed twice with 200 ml of deionized water after which they were dried at 180° F. for 4 hours and pulverized with two passes through the MIKRO-SAMPLMILL using the 0.039" round hole screen.

The particle size distribution of the anionically processed hydrous kaolin product was: 98% <2 micrometers, 93% <1 micrometer, 75% <0.5 micrometer, 33% <0.2 micrometer, and the median size was 0.28 micrometer. Block brightness was 85.7%.

EXAMPLE 3

Tests were carried out to compare the effect of cationic and anionic wet processing on the properties of calcined kaolin opacifying pigment obtained by calcining kaolin products obtained in Examples 1 and 2. The objective was to determine whether cationic processing would influence significant properties of the calcined pigment such as brightness, opacification, abrasion and printing properties.

Abrasiveness of pigment slurries was measured using the "Einlehner" AT-1000 tester. This test measures weight loss of bronze fourdrinier wire when subjected to the rubbing action of a plastic abrader immersed in the pigment slurry. Results are expressed as mg of weight lost per 100,000 revolutions of the abrader. Complete details of the test are given by Neubold, Sennett and Morris, "Abrasiveness of pigments and extenders", Tappi Journal, Dec. 1982, p. 90.

The "needle" abrasion test is designed to measure the abrasivity of pigment coated or filled paper. In this test, the weight loss of a brass needle is measured after a known number of penetrations of a brass needle through the paper. A complete description of the method is given by Kurrle, "Correlation of IPC needle penetration test with guillotine trimmer knife life", Tappi Journal, July 1980, p. 100.

Samples of wet processed, dried and pulverized fine fractions of the kaolin from Example 1 (Dixie/Califf crude) and Example 2 (Dixie crude) were used in the tests.

Portions of the dried and double pulverized fine fractions were calcined in laboratory muffle furnaces preheated to 1680° F. or 1980° F. The 100% Dixie fractions (anionic and cationic processed) of Example 3 were treated at 1680° F. for 40 minutes in an attempt to yield 90% block brightness products and the 50% Dixie/50% Califf magnetically treated and bleached fractions (anionic and cationic processed) were calcined at 1980° F. for 40 minutes to yield 93% block brightness products. All of the calcined products were then pulverized in the MIKRO-SAMPLMILL, 1 pass through the 0.039" round hold screen.

All four calcined, repulverized products were initially made down at low shear into 50% solids slurries with deionized water and 0.10% polyacrylate (C211) dispersant, followed by high shear mixing on the Waring Blendor ® mixer for 1 minute. Additional dispersant was added to each slurry until a minimum Brookfield viscosity was obtained. Each optimally dispersed slurried sample was then incorporated into a rotogravure paper coating. The coating formulations prepared at 57% solids contained: 85 parts Nuclay ® hydrous kaolin, 15 parts calcined clay, 7 parts Penford Gum ® 280 starch, 4 parts Dow 620A latex, and 0.5 parts Nopcote ® C-104 calcium stearate emulsion (all parts on dry basis). All coatings were finally adjusted to pH 8.0 with dilute ammonium hydroxide.

Coating weights of 4.4, 5.5, and 6.7 pounds coating per 3300 square feet of paper for each coating was applied to the wire side of a light weight (25#/ream)

publication base stock paper with the aid of the Dow blade coater. Paper optical and print properties were determined using conventional techniques on sheets supercalendered 2 nips at 260 pli and 140° F.

TABLE I lists physical properties of the processed 100% Dixie crudes from Example 2. Particle size distribution of the cationic calciner feed shows no particles with diameters less than 0.2 micrometer while the anionic calciner feed has a considerable amount of these particles. Calcination of the two feeds at 1680° F. for 40 minutes resulted in block brightness increases for the cationic material from 85.4% to 89.8%, a 4.4 point improvement, and for the anionic material from 85.7% to 88.5%, a 2.8 point improvement.

Also shown in TABLE I is that high shear mixed and optimally dispersed slurries prepared at 50% solids content for both systems had equivalent slurry pH and Brookfield viscosity. Hercules viscosity of the cationically calcined product was improved. Films laid on black glass plates from 30% solids slurries (diluted 50% solids slurries) showed a 64% gloss for the cationically processed calcined material and a 70% gloss for the anionically processed calcined material. Light scattering coefficients of both systems were virtually the same. An Einlehner abrasion of 6 mg loss/100,000 revolutions for the cationically processed calcined products was 33% lower than the 9 mg loss/100,000 revolutions value obtained for the anionically processed calcined product.

Surprisingly, particle size distribution for the cationically processed calcined product was considerably coarser than the anionically processed product in spite of the fact that it was less abrasive.

TABLE II lists physical properties of the processed 50%/50% blend of Dixie/Califf crudes (Example 1). Particle size distribution of the cationic calciner feed show no particles with diameters less than 0.2 micrometers while the anionic calciner feed has a considerable amount of these particles. Block brightness was marginally better for the cationic calciner feed (87.9%) than the anionic calciner feed (87.2%).

Calcining both materials increased their block brightness values to 93.0%. High sheared optimally dispersed 50% solids content slurries for both systems had equal slurry pH and Brookfield viscosity. Hercules viscosity was better for the cationically processed calcined product. Films laid on black glass plates from 30% solids slurries (diluted 50% solid slurries) had 57% gloss for the cationically processed calcined material and 65% gloss for the anionically processed calcined material. Light scattering coefficients of both systems were the same. Einlehner abrasion of 20 mg value obtained for the cationically processed calcined product was 30% lower than the 29 mg loss/100,000 revolutions value obtained for the anionically processed calcined product. However, needle abrasion was higher. Particle size distribution for the cationically processed calcined product was considerably coarser than the anionically processed calcined product.

TABLE III lists optical properties obtained from supercalendered sheets coated at 4.4, 5.5, and 6.7 lb/3300 ft² with 15 parts of each of the four calcined pigments and 85 parts Nuclay starch/latex coating formulations on a 25#/ream base stock. No significant differences in sheet gloss, brightness and opacity at equivalent coating weights were observed.

TABLE IV lists printing properties for the same supercalendered coated sheets. The test procedures used are known in the industry and are described or cited in U.S. Pat. No. 4,738,726, Pratt, et al supra. All four calcined products exhibit equal IGT dry pick strength at equal coating weights. However, Heliotest data showed cationically processed calcined products had significantly better rotogravure printability than anionically processed calcined products.

Chemical compositions determined on the calcined products are listed in TABLE V. The cationically processed materials had marginally lower amounts of titanium dioxide and calcium oxide than the anionic materials which may be due to the differences in particle size distribution between the two.

In conclusion, overall evaluation of all systems show greater improvements in rotogravure printability and Einlehner abrasion for kaolins processed cationically before calcination than ones processed anionically.

TABLE I

Physical Properties of 100% Dixie Fine Fraction Kaolins Processed Anionically and Cationically.

| PROPERTIES | DIXIE ANIONIC PROCESS | CATIONIC PROCESS |
|---|---|---|
| HYDROUS KAOLIN | | |
| Particle size distribution, e.s.d. | | |
| wt. % less than 2 micrometers | 98 | 95 |
| wt. % less than 1 micrometer | 93 | 81 |
| wt. % less than 0.5 micrometer | 75 | 50 |
| wt. % less than 0.2 micrometer | 33 | 0 |
| median (micrometers) | 0.28 | 0.50 |
| Block Brightness, % | 85.7 | 85.4 |
| CALCINED KAOLIN | | |
| Temp./Time | 1680° F./40 min. | 1680° F./40 min. |
| Block Brightness, % | 88.5 | 89.8 |
| 50% Solids highly sheared slurries | | |
| % C211 (polyacrylate) dispersant | 0.200 | 0.175 |
| slurry pH | 6.1 | 6.0 |
| Brookfield viscosity | | |
| cps @ 10 rpm | 40 | 36 |
| cps @ 20 rpm | 38 | 36 |
| cps @ 100 rpm | 58 | 58 |
| Hercules viscosity rpm/dyne-cm × 10⁵ | 360/16 | 580/16 |
| 30% Solids slurries black glass evaluation | | |
| 75° gloss (%) | 70 | 64 |
| S457* m²/kg | 218 | 227 |
| S577* m²/kg | 132 | 142 |
| Einlehner Abrasion (mg/100,000 revolutions) | 9 | 6 |
| Particle size distribution, e.s.d. | | |
| % less than 2 micrometers | 98 | 92 |
| % less than 1 micrometer | 84 | 71 |
| % less than 0.5 micrometer | 24 | 19 |
| % less than 0.2 micrometer | 0 | 0 |
| median (micrometer) | 0.64 | 0.74 |

*Light scattering at the indicated wavelength (457 or 577 nanometers).

TABLE II

Physical Properties of 50% Dixie/50% Califf Fine Fraction Kaolins Processed Anionically and Cationically.

| PROPERTIES | 50% DIXIE:50% CALIFF ANIONIC PROCESS | CATIONIC PROCESS |
|---|---|---|
| HYDROUS KAOLIN | | |
| Particle size distribution, e.s.d. | | |
| wt. % less than 2 micrometers | 98 | 92 |
| wt. % less than 1 micrometer | 96 | 80 |
| wt. % less than 0.5 micrometer | 82 | 53 |
| wt. % less than 0.2 micrometer | 36 | 0 |
| median (micrometers) | 0.25 | 0.48 |

TABLE II-continued

Physical Properties of 50% Dixie/50% Califf Fine Fraction Kaolins Processed Anionically and Cationically.

50% DIXIE:50% CALIFF

| PROPERTIES | ANIONIC PROCESS | CATIONIC PROCESS |
|---|---|---|
| % Block Brightness | 87.2 | 87.9 |
| CALCINED KAOLIN | | |
| Temp./Time | 1980° F./40 min. | 1980° F./40 min. |
| % Block Brightness | 93.0 | 93.0 |
| 50% Solids highly sheared slurries | | |
| % C211 disp. on clay | 0.150 | 0.125 |
| slurry pH | 5.7 | 5.6 |
| Brookfield viscosity | | |
| cps @ 10 rpm | 44 | 40 |
| cps @ 20 rpm | 40 | 38 |
| cps @ 100 rpm | 70 | 69 |
| Hercules viscosity rpm/dyne-cm × 10$^5$ | 515/16 | 1035/16 |
| 30% Solids slurries black glass evaluation | | |
| 75° gloss (%) | 65 | 57 |
| S457* m$^2$/kg | 266 | 261 |
| S577* m$^2$/kg | 169 | 171 |
| Einlehner Abrasion | | |
| (mg/100,000 revolutions) | 29 | 20 |
| Needle Abrasion (mg) | 370 | 480 |
| Particle size distribution | | |
| less than 2 micrometers | 95 | 86 |
| less than 1 micrometer | 76 | 65 |
| less than 0.5 micrometer | 16 | 9 |
| less than 0.2 micrometer | 0 | 0 |
| median (micrometers) | 0.72 | 0.80 |

*Light scattering at the indicated wavelength (457 or 577 nanometers).

TABLE III

Optical Properties of Anionically and Cationically Processed Calcined Kaolins Coated on 25 lb. Lightweight Publication Base Stock Paper

| | 100% DIXIE CALCINED AT 1680° F. | | | | | | 50% DIXIE/50% CALIFF CALCINED AT 1980° F. | | | | | |
|---|---|---|---|---|---|---|---|---|---|---|---|---|
| | ANIONIC PROCESS coating weight (#/3300 sq. ft.) | | | CATIONIC PROCESS coating weight (#/3300 sq. ft.) | | | ANIONIC PROCESS coating weight (#/3300 sq. ft.) | | | CATIONIC PROCESS coating weight (#/3300 sq. ft.) | | |
| OPTICAL PROPERTIES | 4.3 | 5.5 | 6.7 | 4.4 | 5.5 | 6.7 | 4.4 | 5.4 | 6.7 | 4.4 | 5.6 | 6.7 |
| 75° GLOSS (%) | 35.3 | 43.5 | 52.4 | 36.8 | 44.9 | 53.8 | 37.9 | 45.6 | 54.0 | 37.8 | 45.1 | 52.5 |
| BRIGHTNESS (%) | 75.7 | 76.6 | 77.4 | 75.7 | 76.5 | 77.4 | 76.1 | 76.9 | 77.6 | 75.9 | 76.9 | 77.5 |
| OPACITY (%) | 85.4 | 86.8 | 88.2 | 85.4 | 86.6 | 87.8 | 85.6 | 86.7 | 88.1 | 85.1 | 86.4 | 88.0 |

TABLE IV

Printing Properties of Anionically and Cationically Processed Calcined Kaolins Coated on 25 lb. Lightweight Publication Base Stock Paper

| | 100% DIXIE CALCINED AT 1680° F. | | | | | | 50% DIXIE/50% CALIFF CALCINED AT 1980° F. | | | | | |
|---|---|---|---|---|---|---|---|---|---|---|---|---|
| | ANIONIC PROCESS coating weight (#/3300 sq. ft.) | | | CATIONIC PROCESS coating weight (#/3300 sq. ft.) | | | ANIONIC PROCESS coating weight (#/3300 sq. ft.) | | | CATIONIC PROCESS coating weight (#/3300 sq. ft.) | | |
| PRINTING PROPERTIES | 4.3 | 5.5 | 6.7 | 4.4 | 5.5 | 6.7 | 4.4 | 5.4 | 6.7 | 4.4 | 5.6 | 6.7 |
| IGT DRY PICK (vvp) | 3.0 | 3.4 | 3.8 | 3.2 | 3.6 | 4.0 | 3.2 | 3.4 | 4.0 | 3.0 | 3.6 | 4.2 |
| HELIOTEST (cm to 20th missing dot) | 2.6 | 3.6 | 5.5 | 3.6 | 4.4 | 6.7 | 3.4 | 4.3 | 7.4 | 4.2 | 4.8 | 8.8 |

TABLE V

Chemical Composition of Cationically and Anionically Processed Calcined Products

| | 100% DIXIE 1680° F./40 min. | | 50% DIXIE/50% CALIFF 1980° F./40 min. | |
|---|---|---|---|---|
| COMPONENT* | ANIONIC PROCESS (wt. %) | CATIONIC PROCESS (wt. %) | ANIONIC PROCESS (wt. %) | CATIONIC PROCESS (wt. %) |
| SiO$_2$ | 52.9 | 53.5 | 53.3 | 53.1 |
| Al$_2$O$_3$ | 44.5 | 44.8 | 44.7 | 44.9 |
| Fe$_2$O$_3$ | 0.96 | 0.96 | 0.90 | 0.88 |
| TiO$_2$ | 1.50 | 1.41 | 1.38 | 1.27 |
| CaO | 0.14 | 0.02 | 0.09 | 0.01 |
| K$_2$O | 0.20 | 0.12 | 0.11 | 0.11 |
| Na$_2$O | 0.16 | 0.17 | 0.18 | 0.18 |
| MgO | 0.07 | 0.06 | 0.09 | 0.09 |
| P$_2$O$_5$ | 0.04 | 0.05 | 0.04 | 0.03 |

*After ignition at 1832° F.

We claim:

1. A process for producing a low abrasion calcined kaolin pigment which comprises blunging a crude kaolin clay in water in the presence of a cationic polyelectrolyte to produce an acidic dispersed fluid aqueous clay pulp, the kaolin in said kaolin crude being at least about 80% by weight finer than 2 micrometers, removing grit from said pulp, recovering the resultant dispersed acidic pulp after removal of grit to recover a fine particle size fraction of kaolin particles, drying said fraction of fine kaolin particles, and then pulverizing, calcining at a temperature above 400° C. and repulverizing, said process being carried out without adding an anionic dispersant to said kaolin at any stage of the processing from blunging through calcination.

2. The process of claim 1 wherein said cationically dispersed pulp has a pH between 3 and 5.

3. The process of claim 1 wherein the pH of said cationically dispersed pulp is about 4.

4. The process of claim 1 wherein said cationic polyelectrolyte is a quaternary ammonium polymer salt.

5. The process of claim 1 wherein said cationic polyelectrolyte is a diallyl ammonium polymer salt.

6. The process of claim 1 wherein said cationic polyelectrolyte is a diallyl ammonium polymer salt having a molecular weight between $1 \times 10^4$ to $1 \times 10^6$.

7. The process of claim 1 wherein said cationic polyelectrolyte has a molecular weight between about 50,000 and 250,000.

8. The process of claim 1 wherein the dispersant consists of a diallyl ammonium polymer salt used in amount sufficient to impart a positive zeta potential to said kaolin, said pulp has a pH in the range of about 3 to 5 during said processing.

9. The process of claim 1 wherein said cationically dispersed fine particle size fraction is bleached at at 55% to 65% solids without adding acid and then spray dried without prior filtration prior to pulverization.

10. The process of claim 1 wherein said cationically dispersed pulp of fine particle size fraction is flocculated by adding an anionic dispersant, the resulting flocculated slurry is filtered and washed, the resulting filter cake is dispersed by adding an anionic or cationic dispersant and the dispersed filter cake is spray dried prior to pulverization.

11. The process of claim 10 wherein a bleach is added prior to filtration.

12. The process of claim 10 wherein said filter cake is dispersed with a cationic dispersant.

13. The process of claim 10 wherein said filter cake is dispersed with an anionic dispersant.

14. In a process of producing a low abrasion calcined kaolin pigment from a fine particle size fraction of kaolin crude which comprises forming the crude into a fluid dispersed aqueous pulp containing water and a dispersant for said kaolin particles, removing grit from said dispersed aqueous pulp, centrifuging the dispersed aqueous pulp after removal of grit to recover a fine particle size fraction of kaolin particles as a dispersed aqueous pulp, drying said fine particle size fraction of kaolin particles, and then pulverizing, calcining at a temperature over 400° C. and repulverizing said calcined fine particle size fraction of said dried kaolin, the improvement which comprises using a cationic polyelectrolyte in amount sufficient to impart a positive zeta potential and an acidic pH to said kaolin as the dispersant in said process without adding an anionic dispersant to said kaolin at any stage from blunging through calcination.

15. The process of claim 14 in which said crude kaolin clay is degritted, fractionated and bleached while the clay is cationically dispersed and the pulp of bleached clay is spray dried without filtration before pulverization and calcination.

* * * * *